(12) United States Patent
Schilp et al.

(10) Patent No.: US 10,473,328 B2
(45) Date of Patent: Nov. 12, 2019

(54) ACOUSTIC DAMPING SYSTEM FOR A COMBUSTOR OF A GAS TURBINE ENGINE

(71) Applicant: Siemens Aktiengesellschaft, München (DE)

(72) Inventors: Reinhard Schilp, Winter Park, FL (US); David M. Ritland, Winter Park, FL (US); Erick J. Deane, Winter Springs, FL (US); Jaishree Sharma, Orlando, FL (US); Joseph Scott Markovitz, Sanford, FL (US)

(73) Assignee: Siemens Aktiengesellschaft, München (DE)

( * ) Notice: Subject to any disclaimer, the term of this patent is extended or adjusted under 35 U.S.C. 154(b) by 330 days.

(21) Appl. No.: 15/509,286

(22) PCT Filed: Sep. 9, 2014

(86) PCT No.: PCT/US2014/054639
§ 371 (c)(1),
(2) Date: Mar. 7, 2017

(87) PCT Pub. No.: WO2016/039725
PCT Pub. Date: Mar. 17, 2016

(65) Prior Publication Data
US 2017/0276350 A1    Sep. 28, 2017

(51) Int. Cl.
*F23R 3/00*        (2006.01)
*F02C 7/24*        (2006.01)
(Continued)

(52) U.S. Cl.
CPC .......... *F23M 20/005* (2015.01); *F02C 7/24* (2013.01); *F23R 3/002* (2013.01); *F23R 3/06* (2013.01);
(Continued)

(58) Field of Classification Search
CPC .. F23R 3/00; F23R 3/002; F23R 2900/00014; F02C 7/24; F02C 7/045; F23M 20/005; F05D 2260/96; F05D 2260/963
See application file for complete search history.

(56) References Cited

U.S. PATENT DOCUMENTS 6,530,221 B1 * 3/2003 Sattinger ................. F01D 25/30
                                                                181/213
6,837,051 B2 * 1/2005 Mandai ................... F23R 3/005
                                                                60/725
(Continued)

FOREIGN PATENT DOCUMENTS

EP      2397761 A1    12/2011
JP      2004509313 A   3/2004
(Continued)

OTHER PUBLICATIONS

PCT International Search Report and Written Opinion dated May 19, 2015 corresponding to PCT Application No. PCT/US2014/054639 filed Sep. 9, 2014.

*Primary Examiner* — Edgardo San Martin

(57) ABSTRACT

An acoustically dampened gas turbine engine (10) having a gas turbine engine combustor (12) with an acoustic damping resonator system (14) is disclosed. The acoustic damping resonator system (14) may be formed from one or more resonators (16) formed from a resonator housing (18) positioned within the gas turbine engine combustor (12) at an outer housing (20) forming a combustor basket (22) and extending circumferentially within the combustor (12). In at least one embodiment, the resonator housing (18) may include resonator chambers (26) that may be welded in place within resonator chamber (26) receivers (24) but easily replaceable without exposing the resonator housing (18) to damage. In another embodiment, an inner surface (32) of the resonator chamber (26) may be offset radially outward from
(Continued)

an inner surface (34) of the resonator housing (18), thereby creating a flow-path discontinuity and reducing heating of the resonator chamber (26). The acoustic damping resonator system (14) may mitigate dynamics thereby increasing an engine operating envelope and decreasing emissions.

18 Claims, 6 Drawing Sheets

(51) Int. Cl.
  *F02C 7/045* (2006.01)
  *F23M 20/00* (2014.01)
  *F23R 3/06* (2006.01)
  *F23R 3/04* (2006.01)

(52) U.S. Cl.
  CPC ...... *F05D 2260/96* (2013.01); *F23D 2210/00* (2013.01); *F23R 3/04* (2013.01); *F23R 2900/00014* (2013.01)

(56) References Cited

U.S. PATENT DOCUMENTS

| | | | |
|---|---|---|---|
| 7,337,875 B2 * | 3/2008 | Proscia | F02C 7/045 |
| | | | 181/210 |
| 7,874,138 B2 | 1/2011 | Rubio et al. | |
| 8,146,364 B2 * | 4/2012 | Johnson | F23R 3/002 |
| | | | 431/114 |
| 8,528,340 B2 | 9/2013 | Ritland | |
| 8,720,204 B2 * | 5/2014 | Schilp | F23R 3/002 |
| | | | 181/213 |
| 8,973,365 B2 * | 3/2015 | Corr | F23R 3/002 |
| | | | 181/207 |
| 9,395,082 B2 * | 7/2016 | Tiwary | F23M 5/00 |
| 9,810,081 B2 * | 11/2017 | Lee | F01D 9/023 |
| 10,228,138 B2 * | 3/2019 | Theuer | F23R 3/16 |
| 2005/0097890 A1 * | 5/2005 | Ikeda | F23R 3/002 |
| | | | 60/748 |
| 2006/0000220 A1 | 1/2006 | Sattinger | |
| 2007/0102235 A1 | 5/2007 | Tobik et al. | |
| 2007/0169992 A1 | 7/2007 | Wasif et al. | |
| 2008/0216481 A1 * | 9/2008 | Pollarolo | F23R 3/50 |
| | | | 60/725 |
| 2010/0018208 A1 | 1/2010 | Ritland | |
| 2010/0058763 A1 | 3/2010 | Rubio et al. | |
| 2010/0236245 A1 * | 9/2010 | Johnson | F23R 3/002 |
| | | | 60/725 |
| 2010/0319349 A1 | 12/2010 | Rajaram et al. | |
| 2011/0138812 A1 | 6/2011 | Johnson | |
| 2011/0302924 A1 | 12/2011 | Lee et al. | |
| 2012/0006028 A1 | 1/2012 | Lee et al. | |
| 2012/0198854 A1 | 8/2012 | Schilp et al. | |
| 2013/0074501 A1 | 3/2013 | Tiwary et al. | |
| 2014/0216043 A1 | 8/2014 | Cai et al. | |
| 2015/0159878 A1 * | 6/2015 | Schildmacher | F23R 3/58 |
| | | | 60/776 |
| 2017/0227220 A1 * | 8/2017 | Schilp | F23R 3/002 |

FOREIGN PATENT DOCUMENTS

| | | | |
|---|---|---|---|
| JP | 2006097981 A | 4/2006 | |
| JP | 2010539435 A | 12/2010 | |
| JP | 2012500172 A | 1/2012 | |
| JP | 2012520982 A | 9/2012 | |
| WO | 2012057994 A2 | 5/2012 | |
| WO | WO-2018128599 A1 * | 7/2018 | ............ F23R 3/002 |

\* cited by examiner

US 10,473,328 B2

ACOUSTIC DAMPING SYSTEM FOR A COMBUSTOR OF A GAS TURBINE ENGINE

FIELD OF THE INVENTION

The present invention relates in general to gas turbine engines and, more particularly, to acoustic damping systems for damping dynamics in combustors in gas turbine engines.

BACKGROUND OF THE INVENTION

Gas turbine engines typically include a plurality of combustor baskets positioned downstream from a compressor and upstream from a turbine assembly. During operation, longitudinal mode dynamics often occurs in the combustor baskets. The longitudinal mode dynamics usually originates at the inlet of the air flow path in a combustor basket and travels downstream to the turbine inlet. The dynamics restrict the tuning flexibility of the gas turbine engine in order to operate at lower emissions, which is an ever increasing requirement for newer gas turbines.

Resonators have been incorporated into combustors to damp the longitudinal mode dynamics. The resonators have been sized and configured to address specific acoustic tunes. Resonators with various configurations have been employed. Typically, the resonators are positioned within the combustors in the area of highest heat release to be most effective. It is in this position where the resonators are exposed to significant temperatures and thermal gradients. Early configurations including welding resonators directly to the combustor, but often failed due to formation of cracks caused by residual stress and thermal gradients between the weld and the liner, leading to high repair costs, other solutions have been used with limited success because of cracking and significant repair costs. Thus, a need exists for a more efficient, less costly solution to damp longitudinal mode dynamics.

SUMMARY OF THE INVENTION

An acoustically dampened gas turbine engine having a gas turbine engine combustor with an acoustic damping resonator system is disclosed. The acoustic damping resonator system may be formed from one or more resonators formed from a resonator housing positioned within the gas turbine engine combustor at an outer housing forming a combustor basket and extending circumferentially within the combustor. In at least one embodiment, the resonator housing may include one or more resonator chamber receivers supporting one or more resonator chambers, whereby the resonator chamber may be welded in place within the resonator chamber receivers but easily replaceable without exposing the resonator housing to damage. In another embodiment, a joint formed between the resonator chamber and the resonator housing may form a crevice whereby an inner surface of the resonator chamber is offset radially outward from an inner surface of the resonator housing, thereby creating a flow-path discontinuity and reducing heating of the resonator chamber. The acoustic damping resonator system may mitigate dynamics thereby increasing an engine operating envelope and decreasing emissions.

In at least one embodiment, the acoustic damping resonator system for a turbine engine may include one or more resonator housings defining at least one inner channel with an inner surface and an outer surface on an opposite side of the at least one resonator housing from the inner surface. The acoustic damping resonator system may include one or more resonator chamber receivers positioned in the resonator housing and formed from at least one orifice. The acoustic damping resonator system may include one or more resonator chambers positioned at least partially within the resonator chamber receiver. The acoustic damping resonator system may include a joint formed between the resonator chamber and the resonator housing defining the resonator chamber receiver. The resonator chamber may include one or more inner surfaces that is generally aligned the inner surface of the resonator housing. In another embodiment, the resonator chamber may include one or more inner surfaces that is offset radially outward from the inner surface of the at least one resonator housing. One or more cooling fluid exhaust orifices may be positioned in the inner surface of the resonator chamber.

In at least one embodiment, a crevice may be formed at the joint created between the resonator chamber and the resonator housing defining the resonator chamber receiver. The resonator chamber may include one or more outer edges that is curved. One or more edges defining the resonator chamber receiver may be curved radially outward. The resonator chamber receiver may also include one or more connection flanges defining at least a portion of the resonator chamber receiver. In at least one embodiment, the connection flange may extend completely around the at least one resonator chamber receiver. The resonator chamber may fit within the resonator chamber receiver defined by the connection flange. The resonator chamber may be welded to the connection flange.

The resonator chamber may be formed from a resonator box having an inner surface, one or more outer surfaces and one or more side surfaces. The side surface may be circular, thereby forming a cylindrical resonator chamber. In another embodiment, the side surface may be formed from at least two surfaces. The side surface may be formed from four side surfaces, thereby forming a resonator box. The resonator chamber may be further defined by a resonator cap coupled to a resonator chamber housing.

In at least one embodiment, the acoustic damping resonator system may include one or more resonator housings defining at least one inner channel with an inner surface and an outer surface on an opposite side of the resonator housing from the inner surface and one or more resonator chamber receivers positioned in the resonator housing and formed from at least one orifice. The acoustic damping resonator system may include one or more connection flanges defining at least a portion of the resonator chamber receiver and one or more resonator chambers positioned at least partially within the resonator chamber receiver. The resonator chamber may fit within the resonator chamber receiver defined by the connection flange. A joint may be formed between the resonator chamber and the resonator housing defining the resonator chamber receiver. In at least one embodiment, the resonator housing may be formed from a sheet metal ring.

In another embodiment, the acoustic damping resonator system may be formed from one or more resonator housings defining one or more inner channels with an inner surface and an outer surface on an opposite side of the resonator housing from the inner surface and one or more resonator chamber receivers positioned in the resonator housing and formed from at least one orifice. The acoustic damping resonator system may include one or more resonator chambers positioned at least partially within the resonator chamber receiver and a joint formed between the resonator chamber and the resonator housing defining the at least one resonator chamber receiver. The resonator chamber may include one or more inner surfaces that is offset radially outward from the inner surface of the resonator housing. The resonator chamber may include one or more outer edges that is curved. One or more edges defining the resonator chamber receiver may be curved radially outward. A crevice may be formed at the joint created between the resonator chamber and the resonator housing defining the resonator chamber receiver.

During use, the acoustic damping resonator system may dampen the longitudinal mode combustion dynamics, thereby permitting the turbine engine operating envelope to be increased. The acoustic damping system may function as a flow conditioner by creating a more uniform flow at the combustor inlet and by creating better mixing profile downstream.

These and other advantages and objects will become apparent upon review of the detailed description of the invention set forth below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
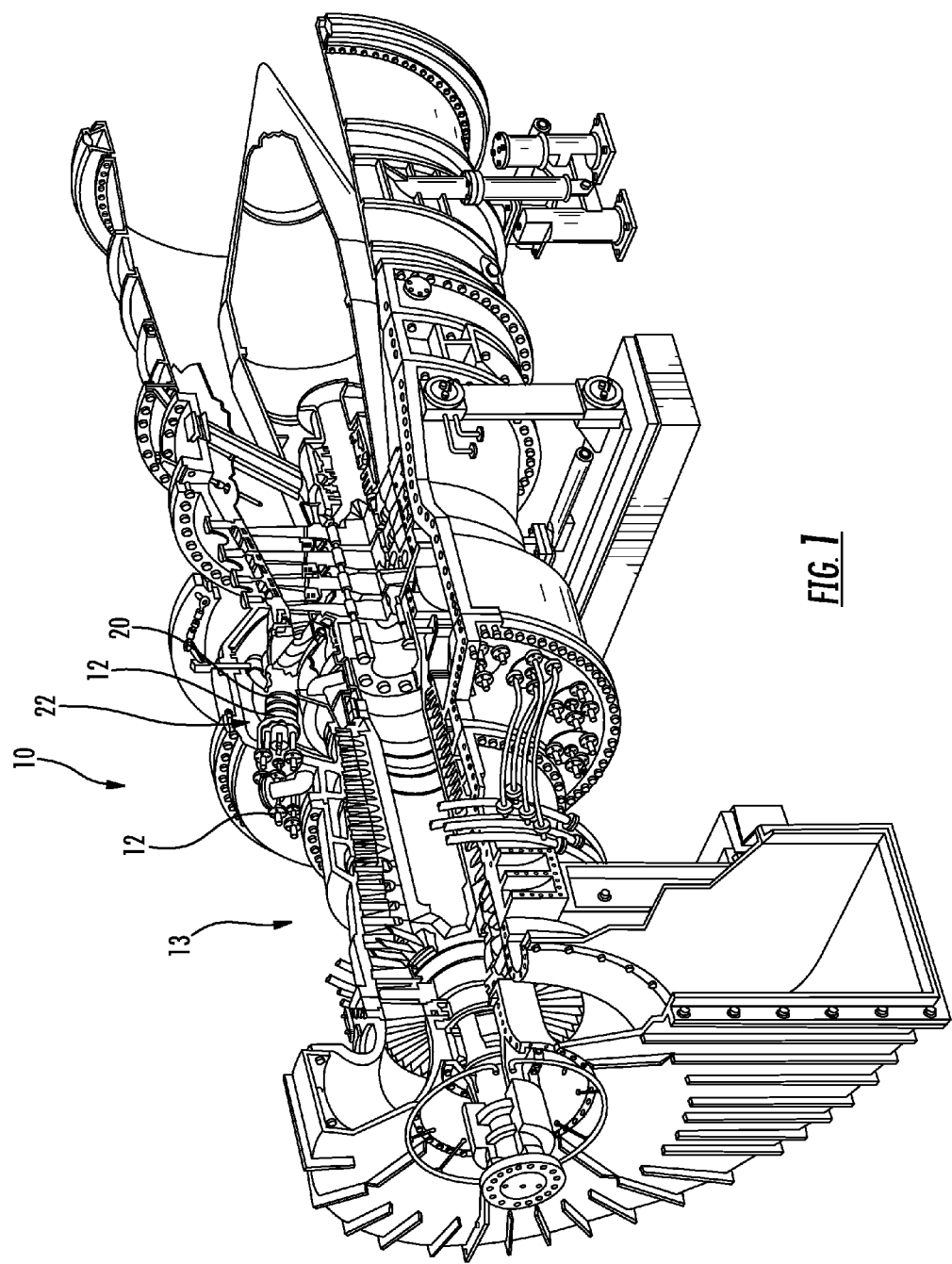
FIG. 1 is partial cross-sectional side view of a combustors positioned within gas turbine engines.
Figure 2:
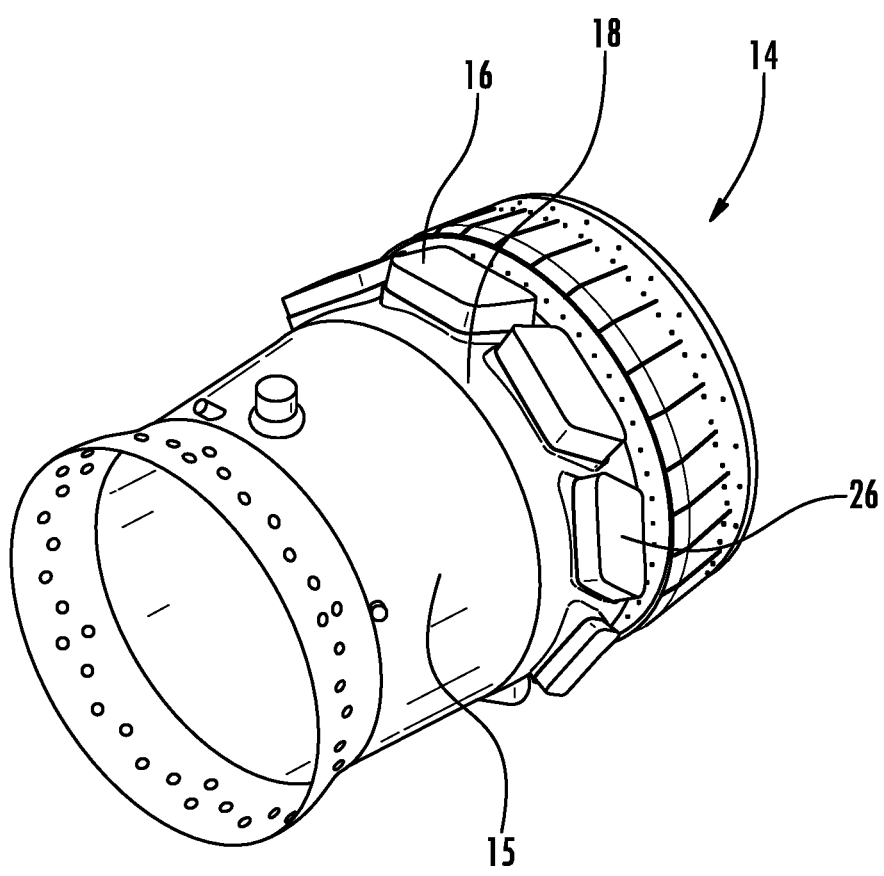
FIG. 2 is a perspective view of a combustor liner with an acoustic damping resonator system.
Figure 3:
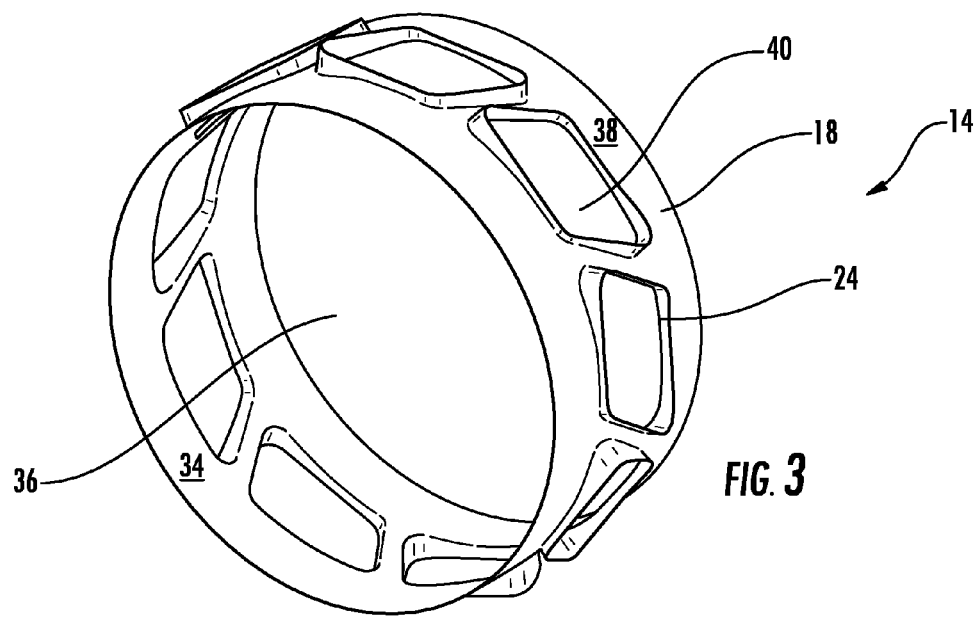
FIG. 3 is a perspective view of the acoustic damping resonator system.

As shown in FIGS. 1-9, an acoustically dampened gas turbine engine 10 having a gas turbine engine combustor 12 with an acoustic damping resonator system 14 is disclosed. The acoustic damping resonator system 14 may be formed from one or more resonators 16 formed from a resonator housing 18 positioned within the gas turbine engine combustor 12 at an outer housing 20 forming a combustor basket 22 and extending circumferentially within the combustor 12. In at least one embodiment, the resonator housing 18 may include one or more resonator chamber receivers 24 supporting one or more resonator chambers 26, whereby the resonator chambers 26 may be welded in place within the resonator chamber receivers 24 but easily replaceable without exposing the resonator housing 18 to damage. In another embodiment, a joint 28 formed between the resonator chamber 26 and the resonator housing 18 may form a crevice 30 whereby an inner surface 32 of the resonator chamber 26 is offset radially outward from an inner surface 34 of the resonator housing 18, thereby creating a flow-path discontinuity and reducing heating of the resonator chamber 26. The acoustic damping resonator system 14 may mitigate dynamics thereby increasing an engine operating envelope and decreasing emissions.

Figure 7:
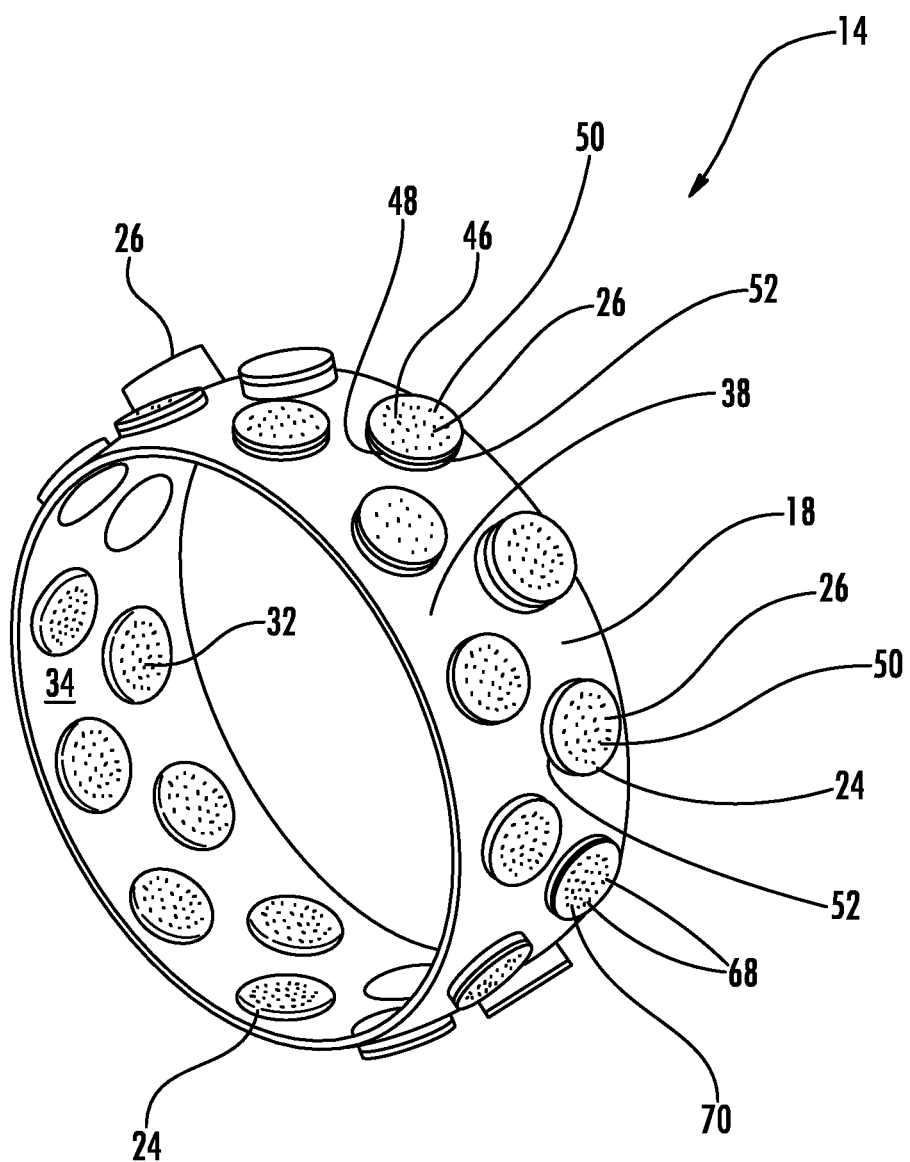
FIG. 7 is perspective view of another embodiment of the resonator chamber positioned within a resonator chamber receiver in the resonator housing.
Figure 8:
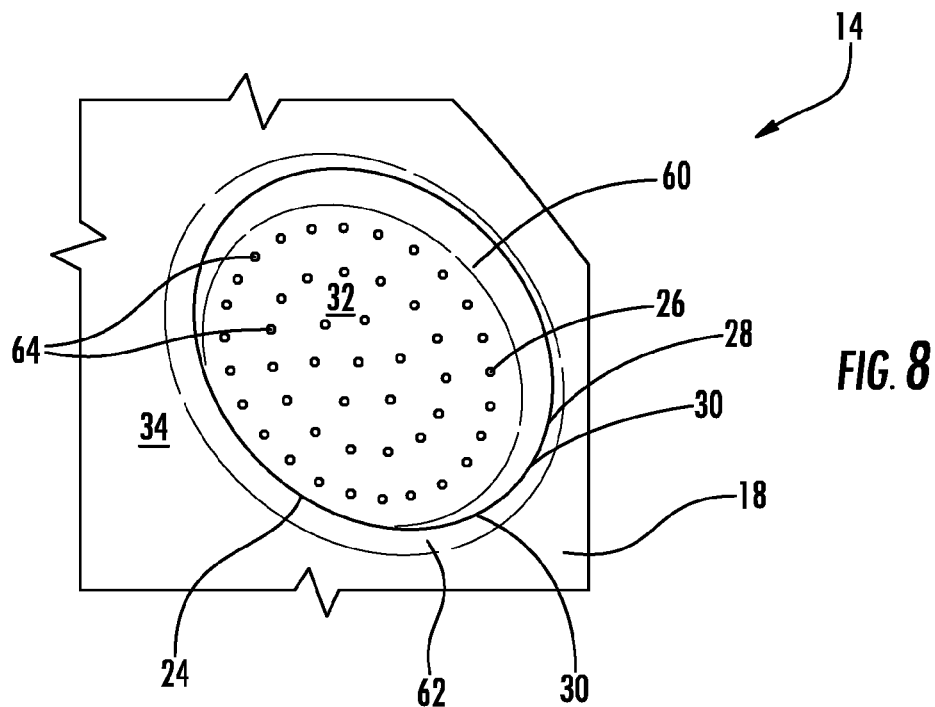
FIG. 8 is a detail view of the resonator chamber of FIG. 7 positioned within a resonator chamber receiver in the resonator housing.
Figure 9:
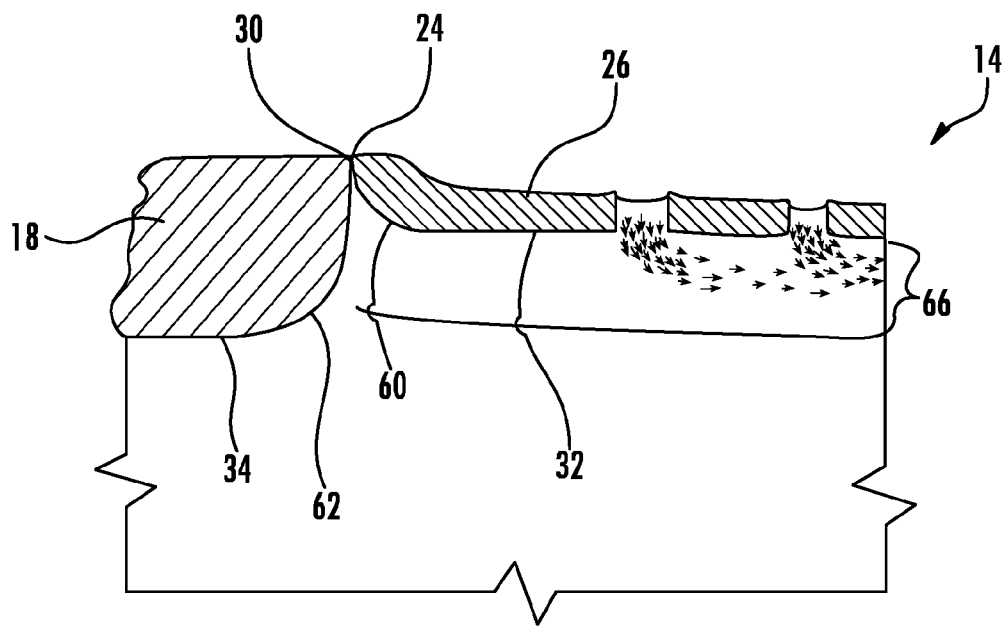
FIG. 9 is a side view of the joint between the resonator chamber and the resonator housing together with air temperatures showing the air residing within the stagnation cooling pocket is cooler than the hot gas path radially inward of the inner surface of the resonator chamber.

The acoustic damping resonator system 14 may be positioned within one or more combustors 12 within a gas turbine engine 10 and together with a combustor liner 15. The combustor 12 may have any appropriate configuration. The combustor 12 may be positioned downstream from a compressor 13 and formed from at least one outer housing defining a combustor basket and at least one upstream wall that is attached to the outer housing, whereby at least one fuel nozzle extends into the combustor 12. In at least one embodiment, the acoustic damping resonator system 14 may include one or more resonator housings 18 defining one or more inner channels 36 with an inner surface 34 and an outer surface 38 on an opposite side of the resonator housing 18 from the inner surface 34. The resonator housing 18 may have any appropriate configuration. In at least one embodiment, as shown in FIGS. 7-9, the resonator housing 18 may be generally cylindrical. The resonator housing 18 may be formed from any material capable of withstanding the high temperatures typically found within the combustor 12. In at least one embodiment, the resonator housing 18 may be formed as a ring from sheet metal. As such, the manufacturing process for forming the resonator housing 18 eliminates the need for conventional mill-machining of the resonator housing 18 and reduces material costs.

The resonator system 14 may include one or more resonator chamber receivers 24 positioned in the resonator housing 18. One or more of the resonator chamber receivers 24 may be formed from at least one orifice 40 extending through the resonator housing 18. The resonator chamber receiver 24 may have any appropriate shape. For example, the resonator chamber receiver 24 may by circular, as shown in FIGS. 7 and 8, a polygon, a quadrilateral, as shown in FIGS. 3-6, or other shape.

The resonator system 14 may include one or more resonator chambers 26 positioned at least partially within the one or more resonator chamber receivers 24. In at least one embodiment, a single resonator chamber 26 may be positioned within a single resonator chamber receiver 24. In other embodiments, two or more resonator chambers 26 may be positioned within a single resonator chamber receiver 24. The resonator chamber 26 may be sized such that when positioned within a single resonator chamber receiver 24 an interference fit is formed. In other embodiments, the resonator chamber 26 may fit closely within the resonator chamber receiver 24 yet not form an interference fit therein. The resonator chamber 26 may be connected to the resonator chamber receiver 24 via a connection system, such as, but not limited to, being welded, such as via a fillet weld.

Figure 4:
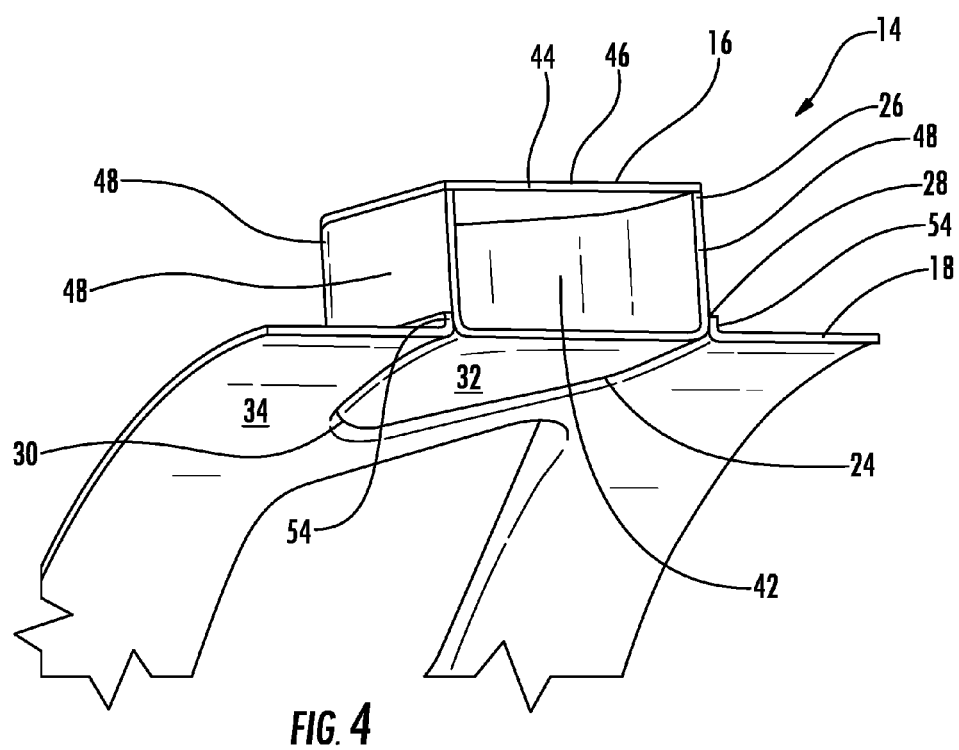
FIG. 4 is a cross-sectional, perspective view of the resonator chamber positioned within a resonator chamber receiver in the resonator housing.
Figure 5:
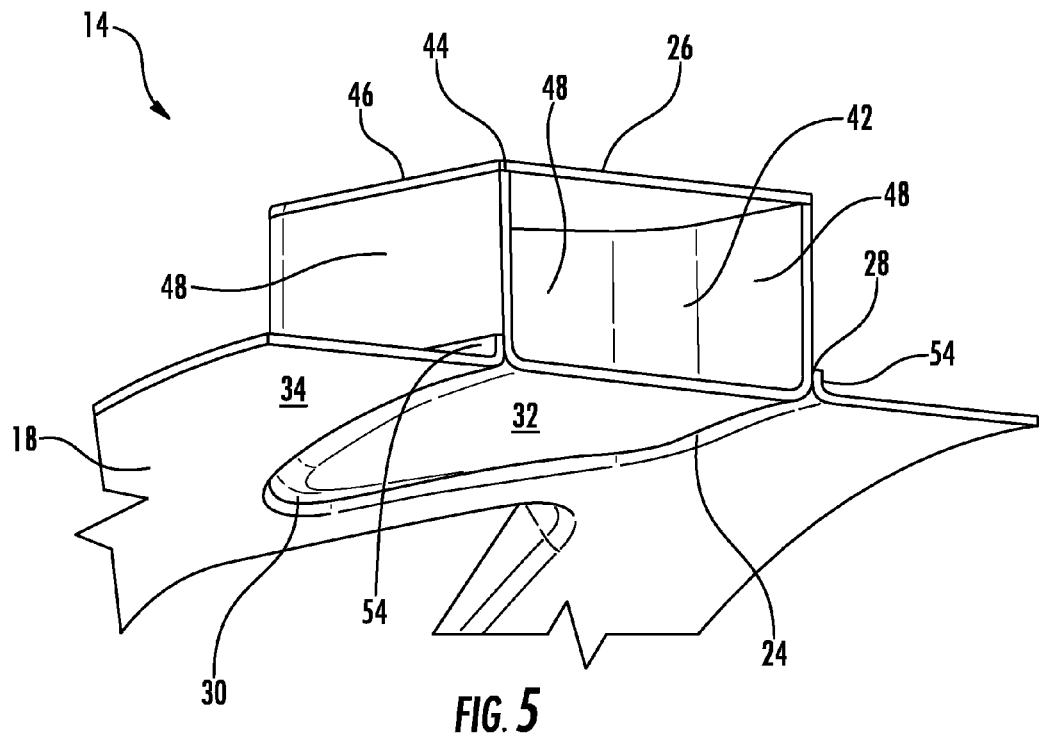
FIG. 5 is another cross-sectional, perspective view of the resonator chamber positioned within a resonator chamber receiver in the resonator housing.
Figure 6:
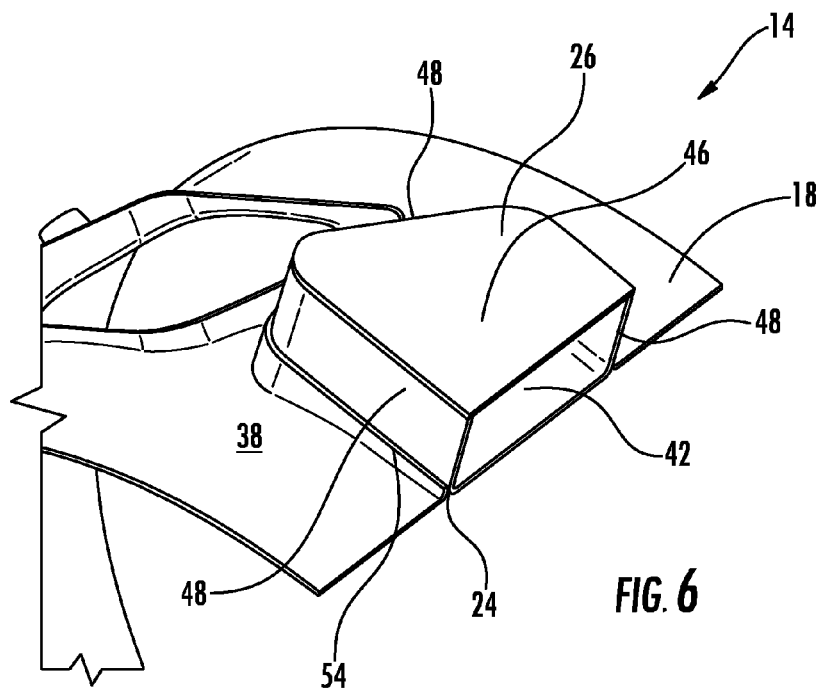
FIG. 6 is cross-sectional, perspective view of the resonator chamber positioned within a resonator chamber receiver in the resonator housing together with a dashed line representing a weld joint that can be separated to remove and replace the resonator chamber, if necessary.

The resonator chamber 26 may have any appropriate configuration. In at least one embodiment, as shown in FIGS. 4-6, the resonator chamber 26 may be formed from a resonator box 44 forming an inner chamber 42. The resonator box 44 may or may not have linear sides. The resonator box 44 forming the resonator chamber 26 may be formed from a resonator box 44 having the inner surface 32, at least one outer surface 46 and at least one side surface 48. As shown in FIGS. 7 and 8, the resonator chamber 26 may include one or more circular side surfaces 48, thereby forming a cylindrical resonator chamber 26. In at least one embodiment, the side surface 48 of the resonator chamber 26 may be formed from at least two surfaces. As shown in FIGS. 4-6, the side surface 48 of the resonator chamber 26 may be formed from four side surfaces 48, thereby forming the resonator box 44.

The resonator chamber 26 shown in FIG. 7 may be formed from a resonator cap 50 coupled to a resonator chamber housing 52. The resonator cap 50 and the resonator chamber housing 52 may be formed as separate components which may be coupled together via a connection system, such as, but not limited to, being welded, such as via a fillet weld. The resonator cap 50 may have any shape, such as, but not limited to, circular, polygon, rectangular or other shape. The resonator chamber housing 52 may have any shape, such as, but not limited to, cylindrical or other shape. In at least one embodiment, as shown in FIG. 7, the resonator cap 50 may have an outer diameter that is generally equal to an outer diameter of the resonator chamber housing 52. In at least one embodiment, as shown in FIG. 7, one or more cooling fluid exhaust orifices 68 may be positioned in a radially outer surface 70 of the resonator chamber 26. The cooling fluid exhaust orifices 68 may have any appropriate shape or size and may be positioned in a pattern or randomly.

In at least one embodiment, one or more resonator chamber receivers 24 may include one or more connection flanges 54 defining at least a portion of the resonator chamber receiver 24. In another embodiment, the connection flange 54 may extends completely around the resonator chamber receiver 24. The connection flanges 54 may be formed from material used to form the resonator housing 18. The connection flange 54 may form a continuous ring about the orifice 40 forming the resonator chamber receiver 24. The connection flange 54 may extend radially outward less than one half a radial height of the resonator chamber 26. In other embodiments, the connection flange 54 may have other heights greater than one half a radial height of the resonator chamber 26. The one resonator chamber 26 may fit within the resonator chamber receiver 24 defined by the connection flange 54. In at least one embodiment, the resonator chamber 26 may be coupled to the connection flange 54 via a connection system, such as, but not limited to, being welded, such as via a fillet weld. The connection flange 54 moves the weld location radially outward and away from the inner surface 34.

As shown in FIGS. 4, 5 and 9, a joint 28 may be formed between the resonator chamber 26 and the resonator housing 18 defining the resonator chamber receiver. The joint 28 may form the connection between the resonator chamber 26 and the resonator housing 18. In at least one embodiment, the joint 28 may include a weld. In at least one embodiment, a crevice 30 is formed at the joint 28 created between the resonator chamber 26 and the resonator housing 18 defining the resonator chamber receiver 24. The resonator chamber 26 may include one or more outer edges 60 that is curved. One or more edges 62 defining the resonator chamber receiver 24 may be curved radially outward. As shown in FIG. 4, the resonator chamber 26 may include an inner surface 32 that is generally aligned the inner surface 34 of the resonator housing 18. The resonator chamber 26 can be removed and replaced without the need of replacing the resonator housing 18.

In another embodiment, as shown in FIGS. 7 and 8, the resonator chamber 26 may include an inner surface 32 that is offset radially outward from the inner surface 34 of the resonator housing 18. The embodiment shown in FIG. 8 may also include one or more cooling fluid exhaust orifices 64 in the inner surface 32. Cooling fluids may be exhausted from the resonator chamber 26 to provide film cooling. In addition, with the inner surface 32 being offset radially outward from the inner surface 34 of the resonator housing 18, a discontinuity in the hot gas flow path is established. The offset inner surface 32 may form a stagnation cooling pocket 66 defined, in part, by the offset inner surface 32 and the edges 62 of the resonator chamber receiver 24. The stagnation cooling pocket 66 collects cooling fluids emitted from the cooling fluid exhaust orifices 64. Thus, the inner surface 32 is exposed to less hot temperatures than conventional configurations.

During use, the acoustic damping resonator system 14 may dampen the longitudinal mode combustion dynamics, thereby permitting the turbine engine operating envelope to be increased. The acoustic damping system 14 may function as a flow conditioner by creating a more uniform flow at the combustor inlet and by creating better mixing profile downstream. If cracks develop within the inner surface 32 of the resonator chamber 26, the crack is contained to only within the inner surface 32 of the resonator chamber 26 and does not spread to the resonator housing 18. The resonator chamber 26 can be removed and replaced without the need of replacing the resonator housing 18.

The foregoing is provided for purposes of illustrating, explaining, and describing embodiments of this invention. Modifications and adaptations to these embodiments will be apparent to those skilled in the art and may be made without departing from the scope or spirit of this invention or the following claims.

We claim:

1. An acoustic damping resonator system for a turbine engine, comprising:
    at least one resonator housing defining at least one inner channel with an inner surface and an outer surface on an opposite side of the at least one resonator housing from the inner surface;
    at least one resonator chamber receiver positioned in the at least one resonator housing and formed from at least one orifice;
    at least one resonator chamber positioned at least partially within the at least one resonator chamber receiver;
    wherein a joint is formed between the at least one resonator chamber and the at least one resonator housing defining the at least one resonator chamber receiver, and
    wherein a crevice is formed at the joint created between the at least one resonator chamber and the at least one resonator housing defining the at least one resonator chamber receiver.

2. The acoustic damping resonator system of claim 1, wherein the at least one resonator chamber includes at least one inner surface that is generally aligned the inner surface of the at least one resonator housing.

3. The acoustic damping resonator system of claim 1, wherein the at least one resonator chamber includes at least one inner surface that is offset radially outward from the inner surface of the at least one resonator housing.

4. The acoustic damping resonator system of claim 3, further comprising at least one cooling fluid exhaust orifice in the at least one inner surface.

5. The acoustic damping resonator system of claim 1, wherein the at least one resonator chamber includes at least one outer edge that is curved.

6. The acoustic damping resonator system of claim 1, wherein at least one edge defining the at least one resonator chamber receiver is curved radially outward.

7. The acoustic damping resonator system of claim 1, wherein the at least one resonator chamber receiver further comprises at least one connection flange defining at least a portion of the at least one resonator chamber receiver.

8. The acoustic damping resonator system of claim 7, wherein the at least one connection flange extends completely around the at least one resonator chamber receiver.

9. The acoustic damping resonator system of claim 7, wherein the at least one resonator chamber fits within the at least one resonator chamber receiver defined by the at least one connection flange.

10. The acoustic damping resonator system of claim 7, wherein the at least one resonator chamber is welded to the at least one connection flange.

11. The acoustic damping resonator system of claim 1, wherein the at least one resonator chamber is formed from a resonator box having the inner surface, at least one outer surface and at least one side surface.

12. The acoustic damping resonator system of claim 1, wherein the at least one side surface is circular, thereby forming a cylindrical resonator chamber.

13. The acoustic damping resonator system of claim 1, wherein the at least one side surface is formed from at least two surfaces.

14. The acoustic damping resonator system of claim 1, wherein the at least one side surface is formed from four side surfaces, thereby forming a resonator box.

15. The acoustic damping resonator system of claim 1, wherein the at least one resonator chamber is further defined by a resonator cap coupled to a resonator chamber housing.

16. An acoustic damping resonator system for a turbine engine, comprising:
at least one resonator housing defining at least one inner channel with an inner surface and an outer surface on an opposite side of the at least one resonator housing from the inner surface;
at least one resonator chamber receiver positioned in the at least one resonator housing and formed from at least one orifice;
at least one connection flange defining at least a portion of the at least one resonator chamber receiver;
at least one resonator chamber positioned at least partially within the at least one resonator chamber receiver;
wherein the at least one resonator chamber fits within the at least one resonator chamber receiver defined by the at least one connection flange;
wherein a joint is formed between the at least one resonator chamber and the at least one resonator housing defining the at least one resonator chamber receiver, and
wherein a crevice is formed at the joint created between the at least one resonator chamber and the at least one resonator housing defining the at least one resonator chamber receiver.

17. The acoustic damping resonator system of claim 16, wherein the at least one resonator housing is formed from a sheet metal ring.

18. An acoustic damping resonator system for a turbine engine, comprising:
at least one resonator housing defining at least one inner channel with an inner surface and an outer surface on an opposite side of the at least one resonator housing from the inner surface;
at least one resonator chamber receiver positioned in the at least one resonator housing and formed from at least one orifice;
at least one resonator chamber positioned at least partially within the at least one resonator chamber receiver; and
wherein a joint is formed between the at least one resonator chamber and the at least one resonator housing defining the at least one resonator chamber receiver;
wherein the at least one resonator chamber includes at least one inner surface that is offset radially outward from the inner surface of the at least one resonator housing, and
wherein the at least one resonator chamber includes at least one outer edge that is curved; wherein at least one edge defining the at least one resonator chamber receiver is curved radially outward; and wherein a crevice is formed at the joint created between the at least one resonator chamber and the at least one resonator housing defining the at least one resonator chamber receiver.

* * * * *